(12) United States Patent
Nagasawa

(10) Patent No.: US 12,248,215 B2
(45) Date of Patent: Mar. 11, 2025

(54) DISPLAY DEVICE

(71) Applicant: Japan Display Inc., Tokyo (JP)

(72) Inventor: Junko Nagasawa, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/479,841

(22) Filed: Oct. 3, 2023

(65) Prior Publication Data

US 2024/0111183 A1 Apr. 4, 2024

(30) Foreign Application Priority Data

Oct. 4, 2022 (JP) ................. 2022-160414

(51) Int. Cl.
*G02F 1/1335* (2006.01)
*G02F 1/1343* (2006.01)
*G02F 1/1362* (2006.01)
*G02F 1/1368* (2006.01)

(52) U.S. Cl.
CPC .. *G02F 1/133514* (2013.01); *G02F 1/134309* (2013.01); *G02F 1/136286* (2013.01); *G02F 1/1368* (2013.01)

(58) Field of Classification Search
CPC .................................................. G02F 1/1343
See application file for complete search history.

(56) References Cited

U.S. PATENT DOCUMENTS

| | | | |
|---|---|---|---|
| 2017/0059914 A1* | 3/2017 | Huang | H01L 27/1248 |
| 2017/0294172 A1* | 10/2017 | Yang | G06F 3/0446 |
| 2018/0107078 A1* | 4/2018 | Ishigaki | H01L 27/1222 |
| 2018/0231829 A1* | 8/2018 | Itou | G02F 1/1343 |
| 2022/0100014 A1* | 3/2022 | Sugimoto | G02F 1/1368 |
| 2023/0112905 A1* | 4/2023 | Cao | H01L 27/124 345/55 |

FOREIGN PATENT DOCUMENTS

| | | |
|---|---|---|
| JP | 2018-066847 A | 4/2018 |
| JP | 2018-132587 A | 8/2018 |

* cited by examiner

*Primary Examiner* — Sang V Nguyen
(74) *Attorney, Agent, or Firm* — XSENSUS LLP

(57) ABSTRACT

According to one embodiment, a display device includes a first scanning line, a second scanning line, an inorganic insulating layer, a first projection located just above the first scanning line and disposed on the inorganic insulating layer, a second projection located just above the second scanning line and disposed on the inorganic insulating layer, a first color filter disposed on the inorganic insulating layer between the first projection and the second projection, an organic insulating layer covering the first projection, the second projection, and the first color filter. A width of the first projection is smaller than a width of the first scanning line. A width of the second projection is smaller than a width of the second scanning line.

13 Claims, 10 Drawing Sheets

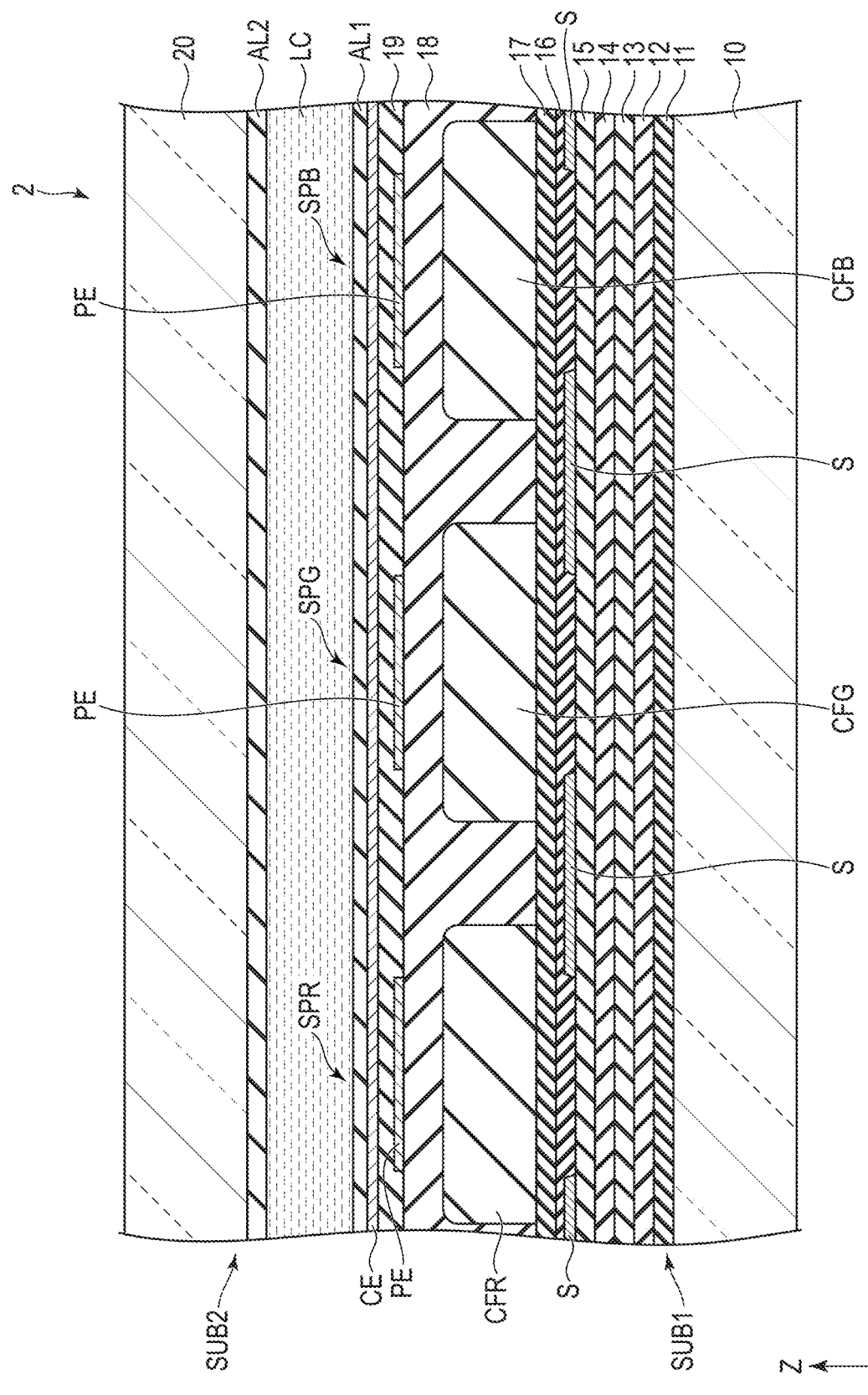
F I G. 3

DISPLAY DEVICE

CROSS-REFERENCE TO RELATED APPLICATIONS

This application is based upon and claims the benefit of priority from Japanese Patent Application No. 2022-160414, filed Oct. 4, 2022, the entire contents of which are incorporated herein by reference.

FIELD

Embodiments described herein relate generally to a display device.

BACKGROUND

As an example of a display device capable of color display, a color-filter-on-array (COA) type of liquid crystal display device with an array substrate comprising a switching element, a pixel electrode, and a color filter has been proposed.

The color filter is formed of, for example, a negative photosensitive resin. With a demand to enlarge a color gamut, there is a tendency to deepen the color of the color filer or thicken the color filter. In this case, at the time of the patterning of the color filter, it is hard for exposure light to reach the bottom part of the color filter, and the bottom part of the color filter cannot be dried sufficiently, so that the color filter having a desired shape may not be formed.

In particular, a liquid crystal display device used for a virtual reality (VR) device, etc., needs to be high-definition with 1,300 ppi or more and its pixel size is extremely small. Thus, the opening of a mask used for patterning the color filter is extremely small and the exposure is limited, so that the photosensitive resin may be cured insufficiently.

For this reason, it is required that a fine color filter be formed into a desired shape.

BRIEF DESCRIPTION OF THE DRAWINGS

FIG. 3 is a schematic cross-sectional view of the display panel 2 along a first direction X of pixels PX shown in FIG. 2.

DETAILED DESCRIPTION

Figure 1:
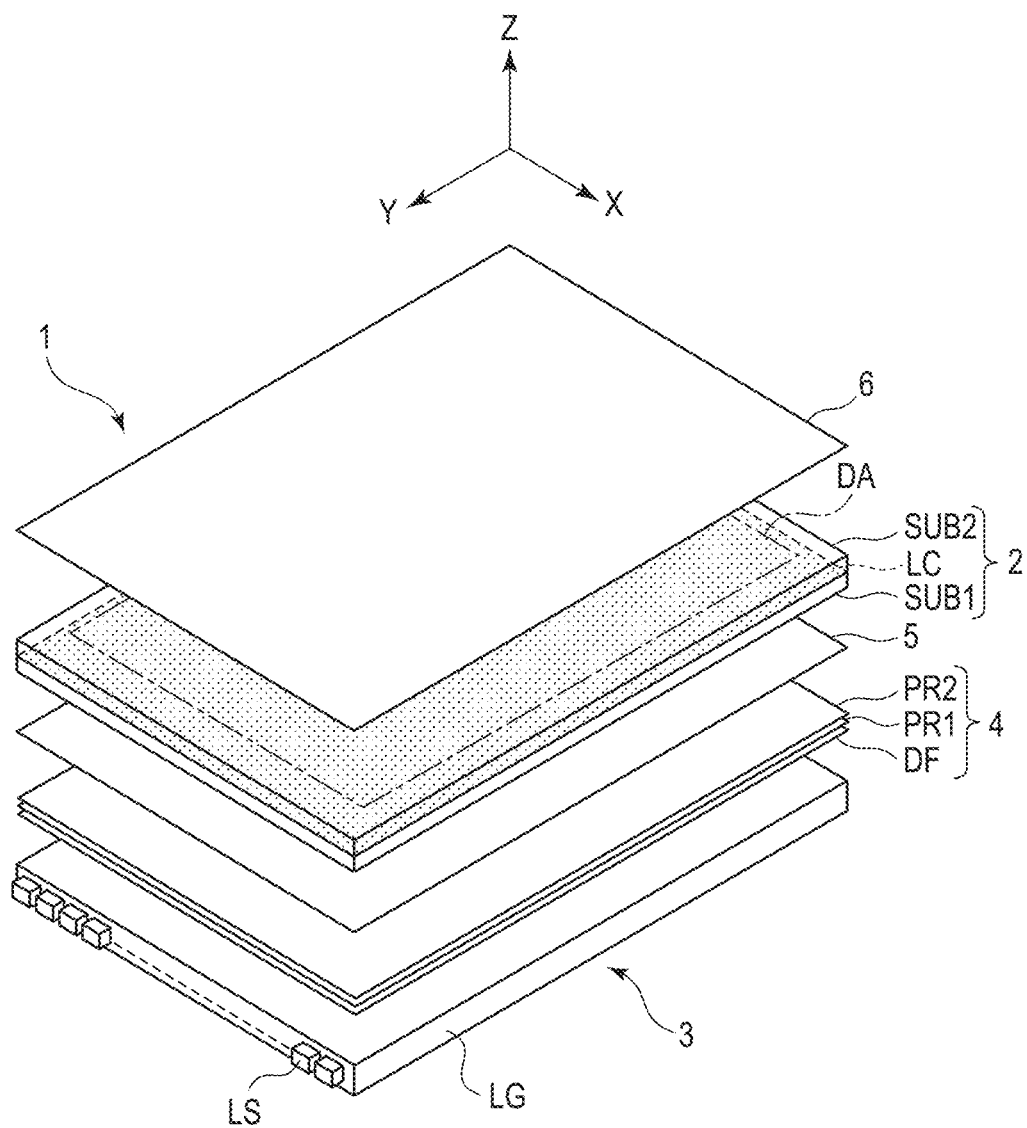
FIG. 1 is a schematic exploded perspective view of a display device 1 according to an embodiment.

One of the objects of the embodiments is to provide a display device comprising a color filter having a desired shape.

In general, according to one embodiment, a display device comprises a substrate, a semiconductor disposed above the substrate, a first scanning line, a second scanning line adjacent to the first scanning line, a connection electrode electrically connected to the semiconductor, an inorganic insulating layer covering the connection electrode, a first projection located just above the first scanning line and disposed on the inorganic insulating layer, a second projection located just above the second scanning line and disposed on the inorganic insulating layer, a first color filter disposed on the inorganic insulating layer between the first projection and the second projection, an organic insulating layer covering the first projection, the second projection, and the first color filter, a pixel electrode disposed above the organic insulating layer and electrically connected to the connection electrode, and a common electrode opposed to the pixel electrode. A width of the first projection is smaller than a width of the first scanning line. A width of the second projection is smaller than a width of the second scanning line.

According to the embodiments, a display device comprising a color filter having a desired shape can be provided.

One embodiment will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In the present embodiment, a liquid crystal display device is disclosed as an example of a display device. Note that the technical ideas disclosed in the present embodiment can be applied to display devices comprising other types of display element, for example, an organic electroluminescent display element, a micro-LED, or a mini-LED, as other display devices. In addition, the technical ideas disclosed in the present embodiment can be applied to an array substrate or an electronic device comprising a sensor element such as a capacitive sensor or an optical sensor as well.

FIG. 1 is a schematic exploded perspective view of a display device 1 according to the present embodiment.

Note that, in order to make the descriptions more easily understandable, some of the drawings illustrate an X axis, a Y axis and a Z axis orthogonal to each other. A direction along the X axis is referred to as a first direction, a direction along the Y axis is referred to as a second direction and a direction along the Z axis is referred to as a third direction. The first direction X and the second direction Y correspond to the directions parallel to a main surface of a substrate that constitutes a display device 1. The third direction Z corresponds to a thickness direction of the display device 1. Further, viewing structural elements in parallel to the third direction Z is referred to as plan view.

The display device 1 comprises a display panel 2 and an illumination device 3. In the example of FIG. 1, the illumination device 3 is a side-edge type, and comprises a light guide LG opposed to the display panel 2 and light-emitting elements LS opposed to a side surface of the light guide LG.

Note that the illumination device 3 is not limited to the example of FIG. 1 and may be other types such as a direct type.

In the example of FIG. 1, the display panel 2 and the light guide LG are both formed into a rectangular shape having short sides in the first direction X and long sides in the second direction Y. Note that the shapes of the display panel 2 and the light guide LG are not limited to rectangular shapes and may be other shapes.

The display panel 2 is a transmissive liquid crystal panel, and comprises a first substrate SUB1 (array substrate), a second substrate SUB2 (counter-substrate) opposed to the first substrate SUB1, and a liquid crystal layer LC disposed between the first substrate SUB1 and the second substrate SUB2. The display panel 2 comprises, for example, a rectangular display area DA.

Moreover, the display device 1 comprises an optical sheet group 4, a first polarizer 5, and a second polarizer 6. The optical sheet group 4 is disposed between the light guide LG and the display panel 2. For example, the optical sheet group 4 includes a diffusion sheet DF which diffuses light emitted from the light guide LG, and a first prism sheet PR1 and a second prism sheet PR2 in which a large number of prisms are formed.

The first polarizer 5 is disposed between the optical sheet group 4 and the first substrate SUB1. The second polarizer 6 is disposed above the second substrate SUB2. The polarization axis of the first polarizer 5 and the polarization axis of the second polarizer 6 are, for example, in a crossed-Nicols relationship in which they are orthogonal to each other.

The display device 1 can be used for various devices, for example, vehicle-mounted equipment, a smartphone, a tablet terminal, a mobile telephone terminal, a personal computer, a television receiver, a game console, and a head-mounted display.

Figure 2:
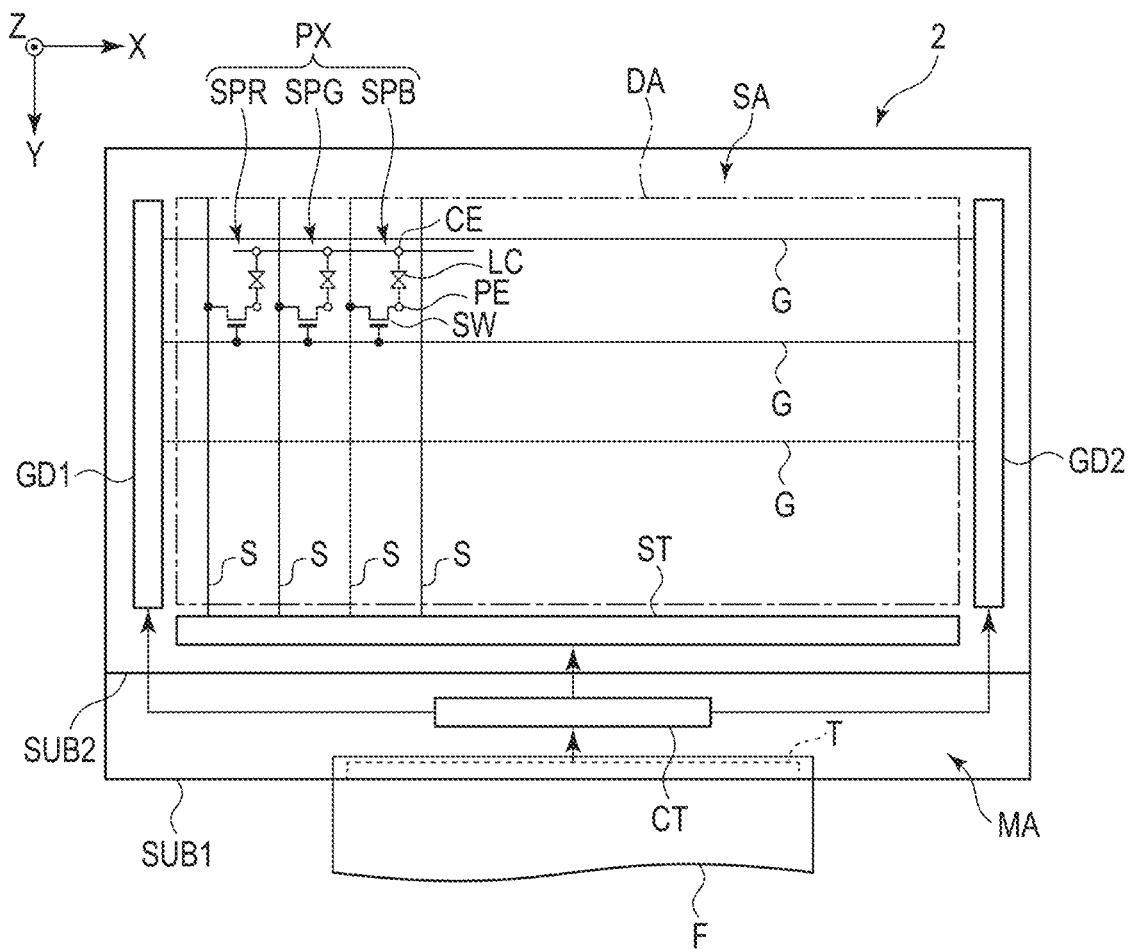
FIG. 2 is a schematic plan view of a display panel 2.

FIG. 2 is a schematic plan view of the display panel 2.

The display panel 2 comprises the display area DA configured to display an image and a surrounding area SA around the display area DA. In the example of FIG. 2, the first substrate SUB1 comprises a mounting area MA which projects in the second direction Y more than the second substrate SUB2. The mounting area MA is part of the surrounding area SA.

The display area DA comprises pixels PX arranged in a matrix in the first direction X and the second direction Y. The pixels PX include subpixels. In the present embodiment, for example, the pixels PX include a red subpixel SPR, a green subpixel SPG, and a blue subpixel SPB. Note that the pixels PX may include a subpixel of another color such as white.

The display panel 2 comprises scanning lines G, signal lines S, scanning drivers GD1 and GD2, and a selector circuit ST. The scanning lines G extend in the first direction X and are arranged in the second direction Y. The signal lines S extend in the second direction Y and are arranged in the first direction X. Each of the scanning lines G is connected to at least one of the scanning driver GD1 and the scanning driver GD2. Each of the signal lines S is connected to the selector circuit ST.

In the example of FIG. 2, a controller CT is mounted in the mounting area MA. In addition, the mounting area MA comprises a terminal portion T. A flexible printed circuit board F is connected to the terminal portion T. Note that the controller CT may be mounted on the flexible printed circuit board F. The controller CT can be composed of an IC chip and various circuit elements.

The controller CT controls the scanning drivers GD1 and GD2 and controls the selector circuit ST. The scanning drivers GD1 and GD2 supply a scanning signal to each of the scanning lines G in order. The selector circuit ST supplies a video signal to each of the signal lines S in order.

Each of the subpixels SPR, SPG, and SPB includes a pixel electrode PE, a switching element SW (thin-film transistor), and a common electrode CE to which a common voltage is applied. The switching element SW is electrically connected to the pixel electrode PE, the scanning line G, and the signal line S. The common electrode CE is formed over subpixels. When a potential difference is formed between the pixel electrode PE and the common electrode CE, an electric field corresponding to the potential difference is formed in the liquid crystal layer LC.

In the present embodiment, the scanning lines G, the signal lines S, the scanning drivers GD1 and GD2, the selector circuit ST, the switching elements SW, the pixel electrodes PE, and the common electrode CE are all formed in the first substrate SUB1.

FIG. 3 is a schematic cross-sectional view of the display panel 2 along the first direction X of the pixels PX shown in FIG. 2.

The first substrate SUB1 comprises a substrate 10, insulating layers 11 to 19, an alignment film AL1, and color filters CFR, CFG, and CFB, in addition to the signal lines S, the scanning lines G, the pixel electrodes PE, and the common electrode CE described above.

The substrate 10 is a transparent insulating substrate, for example, a glass substrate or a resin substrate.

The insulating layers 11 to 15 are stacked in order on the substrate 10. The signal lines S are disposed on the insulating layer 15 at the boundaries between the subpixels adjacent in the first direction X. The insulating layer 16 covers the signal lines S and the insulating layer 15. The insulating layer 17 covers the insulating layer 16.

The red color filter CFR is disposed on the insulating layer 17 in the subpixel SPR. The green color filter CFG is disposed on the insulating layer 17 in the subpixel SPG. The blue color filter CFB is disposed on the insulating layer 17 in the subpixel SPB. In the cross-section shown in the figure, the color filters CFR, CFG, and CFB are separated from each other just above the signal lines S. When illumination light from the illumination device 3 is transmitted through the color filter CFR, red display light is generated. When illumination light is transmitted through the color filter CFG, green display light is generated. When illumination light is transmitted through the color filter CFB, blue display light is generated.

The insulating layer 18 covers the color filters CFR, CFG, and CFB and further covers the insulating layer 17 just above the signal lines S. The insulating layer 18 is formed thicker than the other insulating layers 11 to 17 and 19, and functions as a planarizing layer which planarizes irregularities caused by the color filters CFR, CFG, and CFB, etc.

The pixel electrode PE is disposed on the insulating layer 18 in each of the subpixels SPR, SPG, and SPB. The insulating layer 19 covers the pixel electrode PE and the insulating layer 18. The common electrode CE is disposed on the insulating layer 19. In each of the subpixels SPR, SPG, and SPB, the pixel electrode PE and the common electrode CE are opposed with the insulating layer 19 interposed therebetween. The alignment film AL1 covers the common electrode CE.

Although not shown in the cross-section of FIG. 3, the common electrode CE comprises a slit in each of the subpixels SPR, SPG, and SPB. Through the slit, an electric field acting on the liquid crystal layer LC is formed between the pixel electrode PE and the common electrode CE.

The insulating layers 11 to 17 and 19 are inorganic insulating layers, and the insulating layer 18 is an organic insulating layer. To be specific, the insulating layers 11 and 12 are formed of an inorganic insulating material such as silicon nitride or silicon oxide. The insulating layers 13 and 14 are formed of silicon oxide. The insulating layers 15 to 17 are formed of an inorganic insulating material such as silicon nitride or silicon oxide. The insulating layer 18 is formed of an organic insulating material such as acrylic resin. The insulating layer 19 is formed of silicon nitride.

The alignment film AL1 is formed of, for example, polyimide, and is a horizontal alignment film having alignment restriction force along the X-Y plane. The color filters CFR, CFG, and CFB are formed of, for example, a negative photosensitive resin.

The pixel electrodes PE and the common electrode CE are formed of a transparent conductive material such as indium tin oxide (ITO). The signal lines S and the scanning lines G shown in FIG. 1 are formed of a metallic material such as titanium, aluminum, molybdenum, or tungsten. The signal lines S and the scanning lines G may be formed as a single-layer body, or may be formed as a multilayered body comprising different types of stacked metallic layer.

The structure of the first substrate SUB1 is not limited to the example of FIG. 3. For example, the pixel electrodes PE may be formed higher (closer to the liquid crystal layer LC) than the common electrode CE.

The above-described COA type is suitable for a display device which is required to be high-definition with more than 1,400 ppi.

The second substrate SUB2 is opposed to the first substrate SUB1 in the third direction Z. The liquid crystal layer LC is located between the first substrate SUB1 and the second substrate SUB2.

The second substrate SUB2 comprises a substrate 20 and an alignment film AL2. Preferably, the second substrate SUB2 should not comprise a light-shielding layer such as a so-called black matrix. Accordingly, even if misalignment occurs when the first substrate SUB1 and the second substrate SUB2 are attached to each other, the display quality of the display device 1 can be maintained well.

Figure 4:
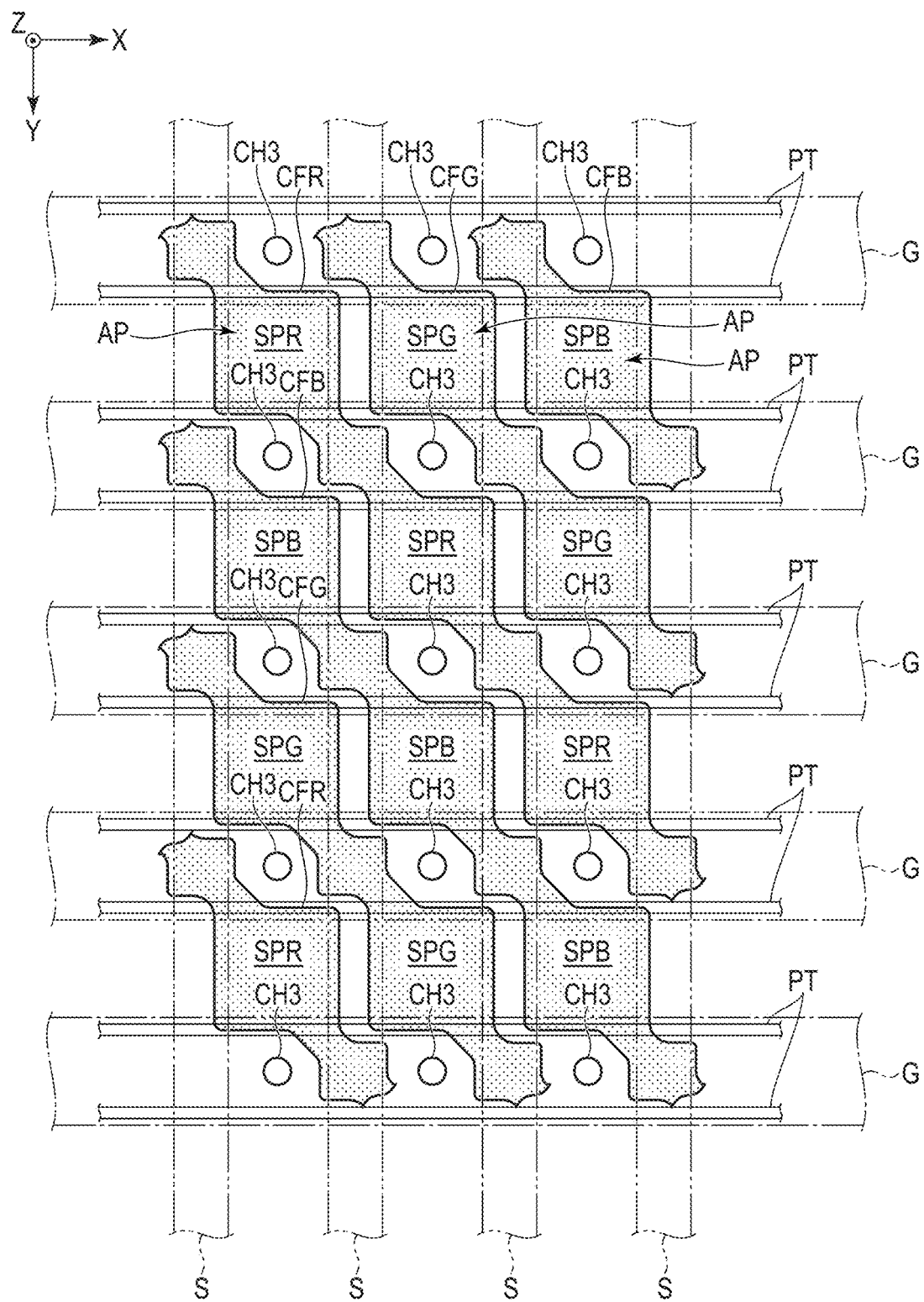
FIG. 4 is a schematic plan view of some elements of a first substrate SUB1.

FIG. 4 is a schematic plan view of some elements of the first substrate SUB1.

This figure shows an example of the shapes of the scanning lines G, the signal lines S, and the color filters CFR, CFG, and CFB.

In the example of FIG. 4, the scanning lines G extend straight in the first direction X and the signal lines S extend straight in the second direction Y. The width in the second direction Y of the scanning lines G is greater than the width in the first direction X of the signal lines S. Note that the scanning lines G and the signal lines S do not necessarily need to be straight and may include a bent portion.

The scanning lines G and the signal lines S cross each other. An area surrounded by adjacent two scanning lines G and adjacent two signal lines S corresponds to an aperture AP of a subpixel. Each of the subpixels SPR, SPG, and SPB comprises the aperture AP.

In the example of FIG. 4, in the first direction X, the subpixels SPR, SPG, and SPB are arranged in order, and in the second direction Y, the subpixels SPR, SPB, and SPG are arranged in order. In this arrangement state, a line of subpixels SPR arranged in an oblique direction crossing the first direction X and the second direction Y, a line of subpixels SPG arranged in the oblique direction, and a line of subpixels SPB arranged in the oblique direction are formed alternately in the display area DA.

The color filter CFR is disposed along the line of subpixels SPR arranged in the oblique direction. That is, the color filters CFR disposed in the subpixels SPR adjacent in the oblique direction, respectively, are formed integrally. In each of the subpixels SPR, the color filter CFR overlaps the aperture AP.

The color filter CFG is disposed along the line of subpixels SPG arranged in the oblique direction. In each of the subpixels SPG, the color filter CFG overlaps the aperture AP.

The color filter CFB is disposed along the line of subpixels SPB arranged in the oblique direction. In each of the subpixels SPB, the color filter CFB overlaps the aperture AP.

The color filters CFR, CFG, and CFB are separated from each other in the areas overlapping the scanning lines G and the areas overlapping the signal lines S. In each of the subpixels SPR, SPB, and SPG, a contact hole CH3 for connecting a pixel electrode and a connection electrode overlaps the scanning line G and does not overlap the color filters CFR, CFG, and CFB, which will be described later.

Note that the shapes of the color filters CFR, CFG, and CFB are not limited to the example shown in the figure, and for example, each of the color filters CFR, CFG, and CFB may be disposed per aperture AP and formed into the shape of an island, or may be formed into the shape of a stripe extending in the second direction Y.

Projections PT are located just above the scanning lines G and extend straight in the first direction X. In addition, each of the projections PT is formed to cross the signal lines S. The projections PT are arranged in the second direction Y. Just above each of the scanning lines G, two projections PT adjacent in the second direction Y are disposed. The contact holes CH3 are located between two projections PT. The projections PT overlap edge portions along the first direction X of the color filters CFR, CFG, and CFB. For example, each projection PT overlaps the edge portion of the color filter CFR in the subpixel SPR, overlaps the edge portion of the color filter CFG in the subpixel SPG, and overlaps the edge portion of the color filter CFB in the subpixel SPB. In addition, in each of the apertures AP, one of the color filters CFR, CFG, and CFB is disposed between two projections PT adjacent in the second direction Y.

Figure 5:
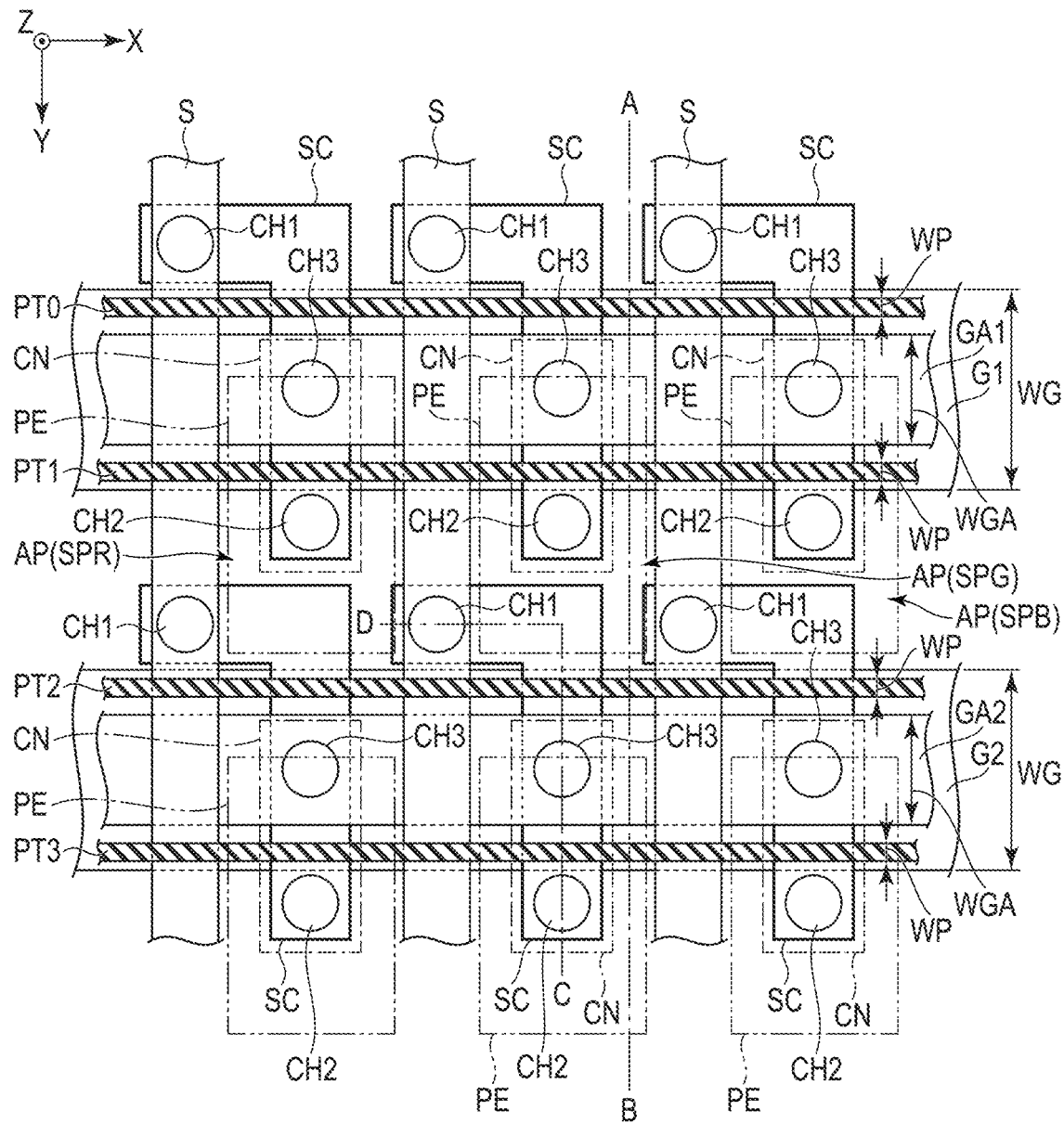
FIG. 5 is a schematic plan view of the structures of subpixels SPR, SPB, and SPG.

FIG. 5 is a schematic plan view of the structures of the subpixels SPR, SPB, and SPG.

In FIG. 5, connection electrodes CN are represented by alternate long and short dashed lines, the pixel electrodes PE are represented by alternate long and two short dashed lines, and the illustration of the color filters and the common electrode is omitted.

Scanning lines G1 and G2 shown in the figure are included in the scanning lines G shown in FIG. 4.

The scanning line G1 and an upper scanning line GA1 are electrically connected to each other. The upper scanning line GA1 overlaps the scanning line G1 and extends straight in the first direction X. The width in the second direction Y of the upper scanning line GA1 is smaller than the width in the second direction Y of the scanning line G1.

The scanning line G2 and an upper scanning line GA2 are electrically connected to each other. The upper scanning line GA2 overlaps the scanning line G2 and extends straight in the first direction X. The width in the second direction Y of the upper scanning line GA2 is smaller than the width in the second direction Y of the scanning line G2.

Projections PT0 to PT3 shown in the FIG. are included in the projections PT shown in FIG. 4.

The projections PT0 and PT1 overlap the scanning line G1 and do not overlap the upper scanning line GA1. The upper scanning line GA1 is located between the projection PT0 and the projection PT1. The width WP in the second direction Y of the projections PT0 and PT1 is smaller than the width WG in the second direction Y of the scanning line G1 and is smaller than the width WGA in the second direction Y of the upper scanning line GA1.

The projections PT2 and PT3 overlap the scanning line G2 and do not overlap the upper scanning line GA2. The upper scanning line GA2 is located between the projection PT2 and the projection PT3. The width WP in the second direction Y of the projections PT2 and PT3 is smaller than the width WG in the second direction Y of the scanning line G2 and is smaller than the width WGA in the second direction Y of the upper scanning line GA2.

For example, in the subpixel SPG, the connection electrode CN is disposed between the adjacent signal lines S, overlaps the scanning line G1 and the upper scanning line GA1, does not cross the projection PT0 but crosses the projection PT1, and extends to the aperture AP.

A semiconductors SC crosses the signal line S, further crosses the scanning line G1 and the upper scanning line GA1, crosses the projections PT0 and PT1, and extends to the aperture AP. The semiconductor SC is electrically connected to the signal line S in a contact hole CH1. In addition, the semiconductor SC is electrically connected to the connection electrode CN in a contact hole CH2. The contact hole CH2 is located at the aperture AP and overlaps the color filter CFG shown in FIG. 4.

The pixel electrode PE is disposed between the adjacent signal lines S, overlaps the scanning line G1 and the upper scanning line GA1, does not cross the projection PT0 but crosses the projection PT1, and extends to the aperture AP. The pixel electrode PE is electrically connected to the connection electrode CN in the contact hole CH3. The contact hole CH3 overlaps the scanning line G1 and the upper scanning line GA1 between the projection PT0 and the projection PT1.

The projection PT0 crosses the signal lines S and the semiconductors SC between the contact holes CH1 and the contact holes CH3. The projection PT1 crosses the signal lines S, the semiconductors SC, the connection electrodes CN, and the pixel electrodes PE between the contact holes CH2 and the contact holes CH3.

While the subpixel SPG has been described with attention here, the other subpixels SPR and SPB are also configured in the same way as the subpixel SPG.

Figure 6:
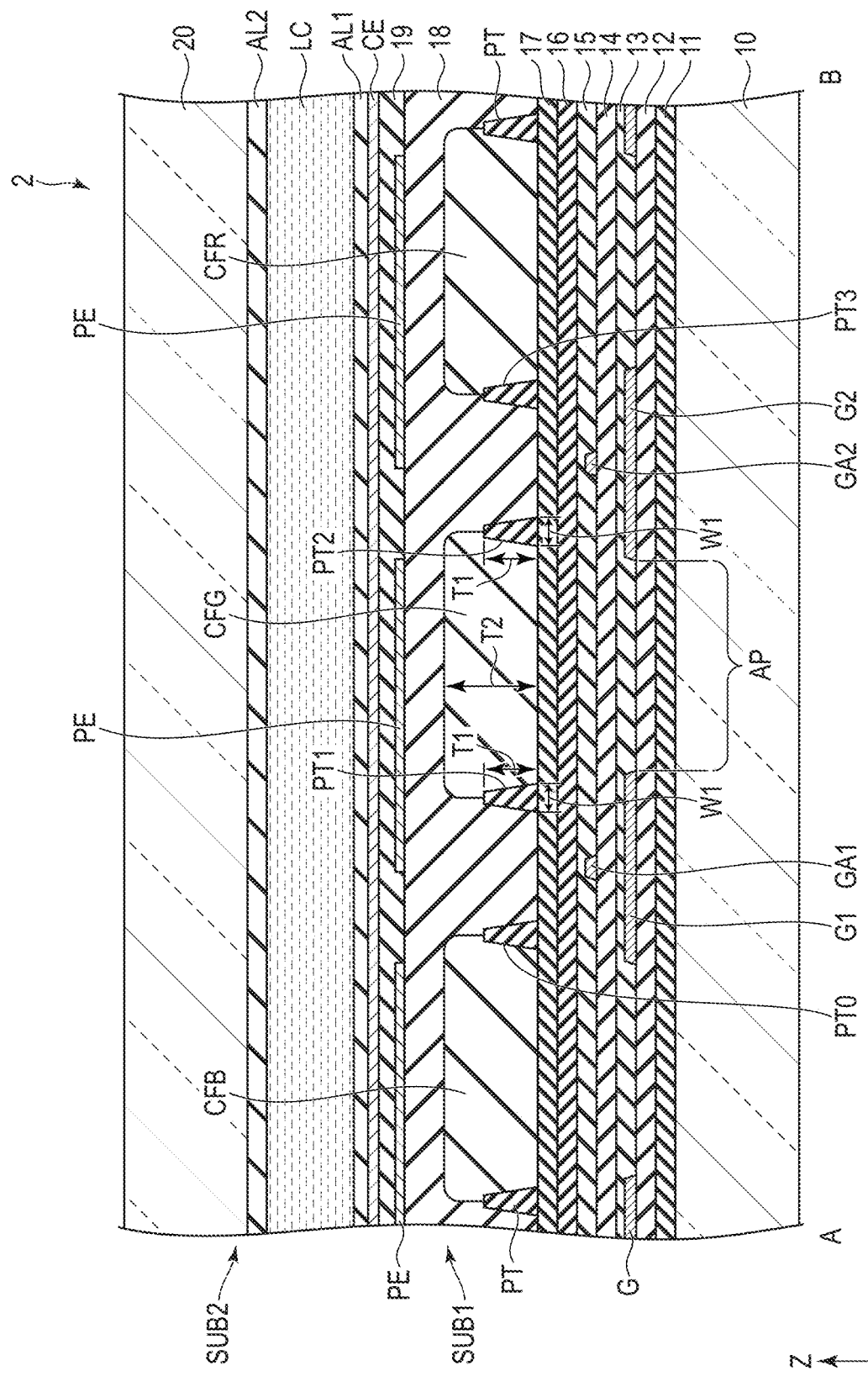
FIG. 6 is a schematic cross-sectional view of the display panel 2 along line A-B shown in FIG. 5.

FIG. 6 is a schematic cross-sectional view of the display panel 2 along line A-B shown in FIG. 5. In FIG. 6, the illustration of the semiconductors SC and the connection electrodes CN shown in FIG. 5 is omitted.

The projections PT including the projections PT0 to PT4 are disposed on the insulating layer 17, which is an inorganic insulating layer, and are covered by the insulating layer 18, which is an organic insulating layer.

For example, the green color filter CFG overlaps the aperture AP between the scanning line G1 and the scanning line G2, is disposed on the insulating layer 17 between the projection PT1 and the projection PT2, contacts the projection PT1 and the projection PT2, and is covered by the insulating layer 18.

The red color filter CFR is separated from the color filter CFG, is disposed on the insulating layer 17 between the projection PT3 and the projection PT, contacts the projection PT3 and the projection PT, and is covered by the insulating layer 18.

The blue color filter CFB is separated from the color filters CFR and CFG, is disposed on the insulating layer 17 between the projection PT and the projection PT0, contacts the projection PT and the projection PT0, and is covered by the insulating layer 18.

In addition, the insulating layer 18 contacts the insulating layer 17 between the projection PT0 and the projection PT1 and between the projection PT2 and the projection PT3.

The projections PT have an equal thickness T1 in the third direction Z. For example, the thickness T1 of each of the projections PT1 and PT2 is smaller than the thickness T2 in the third direction Z of the color filter CFG (T1<T2). The other projections PT are also smaller in thickness than the color filters CFR, CFG, and CFB. For example, the thickness T2 of the color filters is approximately 3 μm, and the thickness T1 of the projections PT is less than or equal to 2 μm.

The projections PT have an equal width W1 in the second direction Y. For example, the width W1 of each of the projections PT1 and PT2 is smaller than the thickness T1 (W1<T1). That is, each of the projections PT is formed into the shape of a wall extending in the third direction Z. For example, the width W1 of the projections PT is approximately 1 μm.

The projections PT preferably should be formed of, for example, a negative photosensitive resin excellent in processability (for example, an acrylic photosensitive resin). The projections PT may be formed of a positive photosensitive resin (for example, a novolac photosensitive resin). The projections PT preferably should be transparent in order to expose the depths to light surely, but may be colored such as black.

Figure 7:
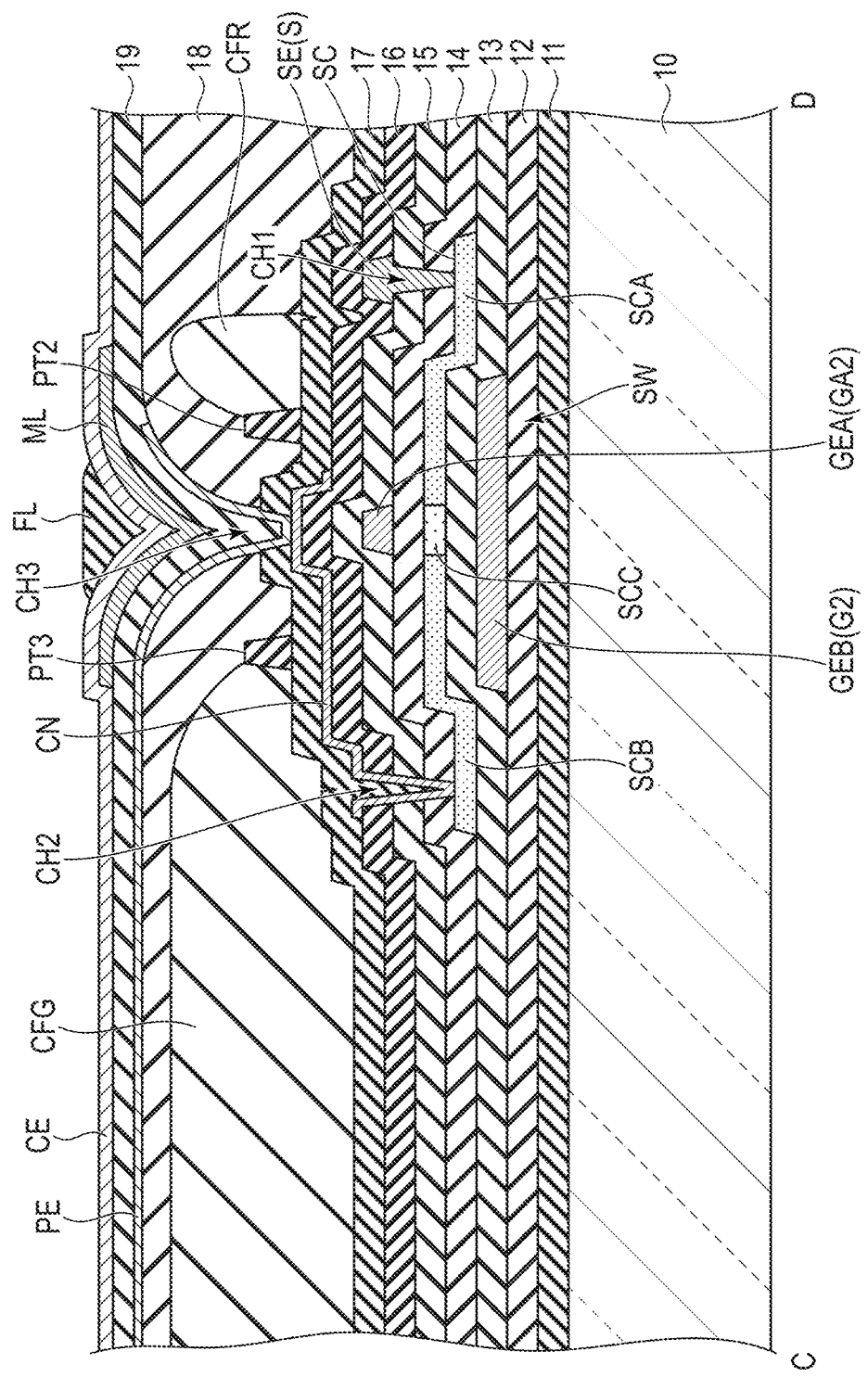
FIG. 7 is a schematic cross-sectional view of the first substrate SUB1 along line C-D shown in FIG. 5.

FIG. 7 is a schematic cross-sectional view of the first substrate SUB1 along line C-D shown in FIG. 5. In FIG. 7, the illustration of the alignment films is omitted.

The semiconductor SC of the switching element SW is disposed on the insulating layer 13 and is covered by the insulating layer 14. The semiconductor SC is transparent and is an oxide semiconductor including, for example, indium or gallium. The semiconductor SC includes low-resistance areas SCA and SCB and a high-resistance area SCC. The high-resistance area SCC is located between the low-resistance area SCA and the low-resistance area SCB. The semiconductor SC is located between the insulating layer 13, which is a silicon oxide layer, and the insulating layer 14, which is a silicon oxide layer.

A lower gate electrode GEB is disposed on the insulating layer 12 and is covered by the insulating layer 13. The lower gate electrode GEB is included in the scanning line G2 shown in FIG. 5. The lower gate electrode GEB is opposed to the semiconductor SC with the insulating layer 13 interposed therebetween. In other words, the lower gate electrode GEB corresponds to an area overlapping the semiconductor SC of the scanning line G2.

A gate electrode GEA is disposed on the insulating layer 14 and is covered by the insulating layer 15. The gate electrode GEA is included in the upper scanning line GA2 shown in FIG. 5. The gate electrode GEA is opposed to the high-resistance area SCC of the semiconductor SC with the insulating layer 14 interposed therebetween. In other words, the gate electrode GEA corresponds to an area overlapping the semiconductor SC of the upper scanning line GA2.

A source electrode SE is disposed on the insulating layer 15 and is covered by the insulating layer 16. The source electrode SE is included in the signal line S shown in FIG. 5. The source electrode SE contacts the low-resistance area SCA of the semiconductor SC in the contact hole CH1 penetrating the insulating layer 14 and the insulating layer 15.

The connection electrode CN is disposed on the insulating layer 16 and is covered by the insulating layer 17. That is, the connection electrode CN is located in a layer different from that of the source electrode SE and the signal line S. The connection electrode CN is a transparent electrode formed of a transparent conductive material such as ITO. The connection electrode CN contacts the low-resistance area SCB of the semiconductor SC in the contact hole CH2 penetrating the insulating layer 14, the insulating layer 15, and the insulating layer 16. The contact hole CH2 overlaps the color filter CFG.

The pixel electrode PE is disposed on the insulating layer 18 and is covered by the insulating layer 19. The pixel electrode PE contacts the connection electrode CN in the contact hole CH3 penetrating the insulating layer 17 and the insulating layer 18. The contact hole CH3 overlaps the gate electrode GEA, is located between the projection PT2 and the projection PT3 and located between the color filter CFG and the color filter CFR adjacent to each other, and does not overlap any color filter.

A metallic layer ML is disposed on the insulating layer 19 in the contact hole CH3. The common electrode CE covers the metallic layer ML, is disposed on the insulating layer 19, and is covered by the alignment film AL1 shown in FIG. 3. That is, the metallic layer ML and the common electrode CE are electrically connected and are at the same potential. In the example shown in the figure, the metallic layer ML is located between the insulating layer 19 and the common electrode CE; however, the common electrode CE may be located between the insulating layer 19 and the metallic layer ML. In addition, in the example shown in the figure, a hollow caused by the contact hole CH3 is filled with a filling material FL. The filling material FL is formed of an organic insulating material, is disposed on the common electrode CE, and is covered by the alignment film AL1.

In the display area DA, in a display device required to be high-definition, the pixel size is small and the distance between adjacent signal lines S is also extremely small. Thus, the connection electrodes CN for electrically connecting the switching elements SW and the pixel electrodes PE are formed in a layer different from that of the signal lines S, and moreover, are formed as transparent electrodes formed of a transparent conductive material. This prevents undesirable contact between the signal lines S and the connection electrodes CN. In addition, since the semiconductors SC connected to the connection electrodes CN at the apertures AP are transparent, a reduction of transmittance at the apertures AP is suppressed.

According to the present embodiment, the deformation of the color filters due to insufficient exposure, etc., is suppressed.

For example, the transmittance of a wavelength of ultraviolet rays (for example, 365 nm) used for exposure of the green color filter CFG is low compared to those of the red color filter CFR and the blue color filter CFB. It is therefore hard for ultraviolet rays to reach the bottom part of the color filter CFG, which may cause insufficient exposure of the bottom part. If the color filter CFG is developed and burnt in such an insufficiently exposed state, a void may be created in the bottom part and extend to an area where a contact hole CH3 should be formed.

To address this, forming the projections PT before forming the color filters as in the present embodiment suppresses the permeation of a developer into the bottom parts of the color filters and suppresses the undesirable extension of the color filters. In this way, the deformation of the color filters can be suppressed.

In addition, since the deformation of the color filters is suppressed, the color filters can be covered surely by the insulating layer 18. Thus, the leakage of impurities from the color filters is suppressed.

In addition, since the extension of the color filters toward the contact holes CH3 is suppressed, the pixel electrodes PE are not cut at the contact holes CH3, and the switching elements S and the pixel electrodes PE can be surely electrically connected.

Moreover, even if the content of coloring included in the color filters is increased or the color filters are thickened with a demand to enlarge a color gamut, the color filters can be processed with accuracy and the color filters having desired shapes can be formed.

While the present embodiment has illustrated an example of the color filters CFR, CFG, and CFB being each disposed between a pair of projections, it is sufficient if a projection PT is provided between a color filter of a color which easily causes insufficient exposure (for example, a green color filter) and a contact hole CH3.

Other configuration examples will be described next.

Figure 8:
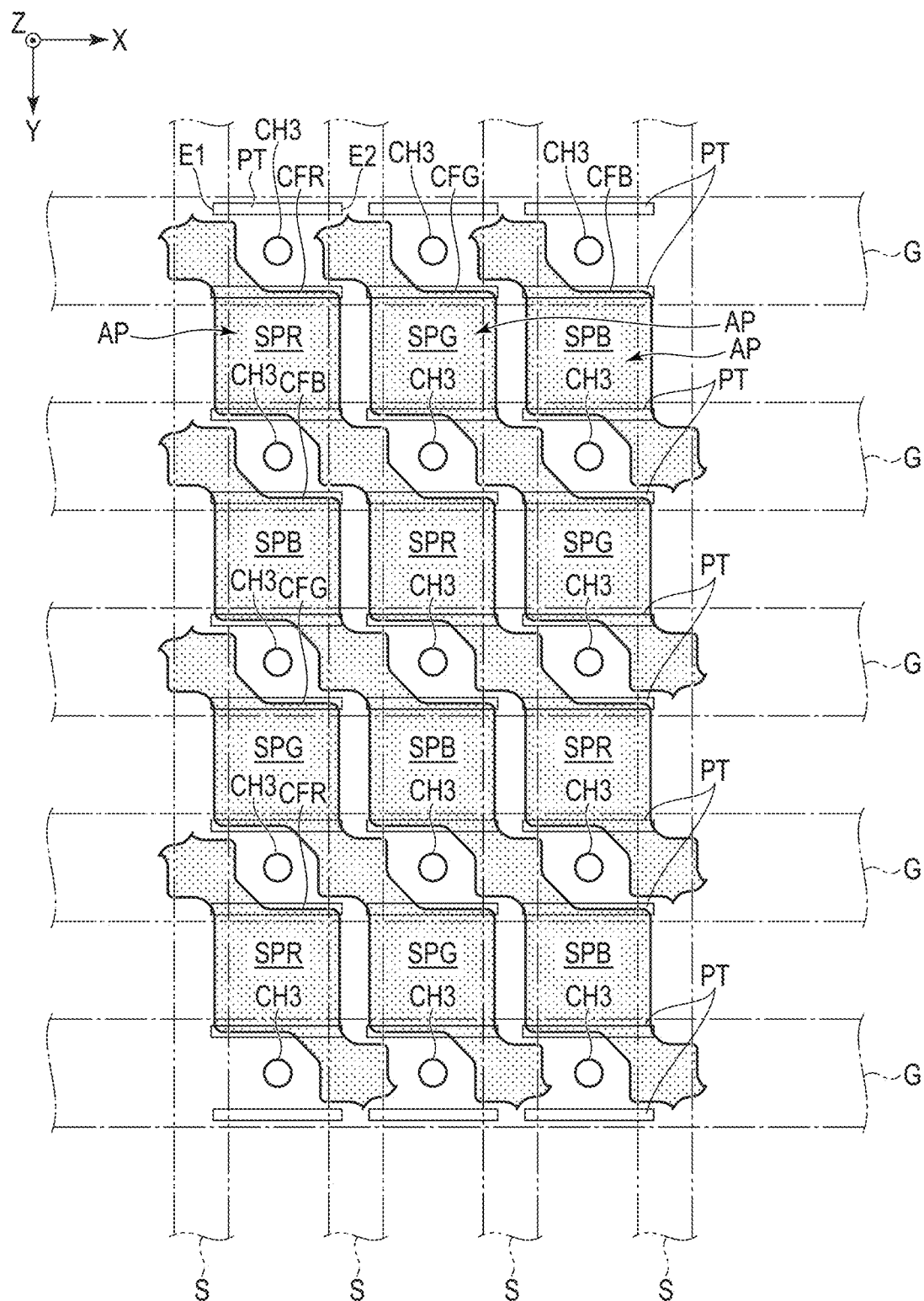
FIG. 8 is a schematic plan view of some elements of the first substrate SUB1.

FIG. 8 is a schematic plan view of some elements of the first substrate SUB1.

The example shown in FIG. 8 is different from the example shown in FIG. 4 in that each of the projections PT is cut at positions overlapping the signal lines S. In the example shown in the figure, each projection PT is located between adjacent signal lines S, extends straight in the first direction X, and comprises an end portion E1 overlapping one signal line S and an end portion E2 overlapping the other signal line S.

In this configuration example, too, the extension in the second direction Y of the color filters toward the contact holes CH3 can be suppressed, as in the above-described configuration examples.

Figure 9:
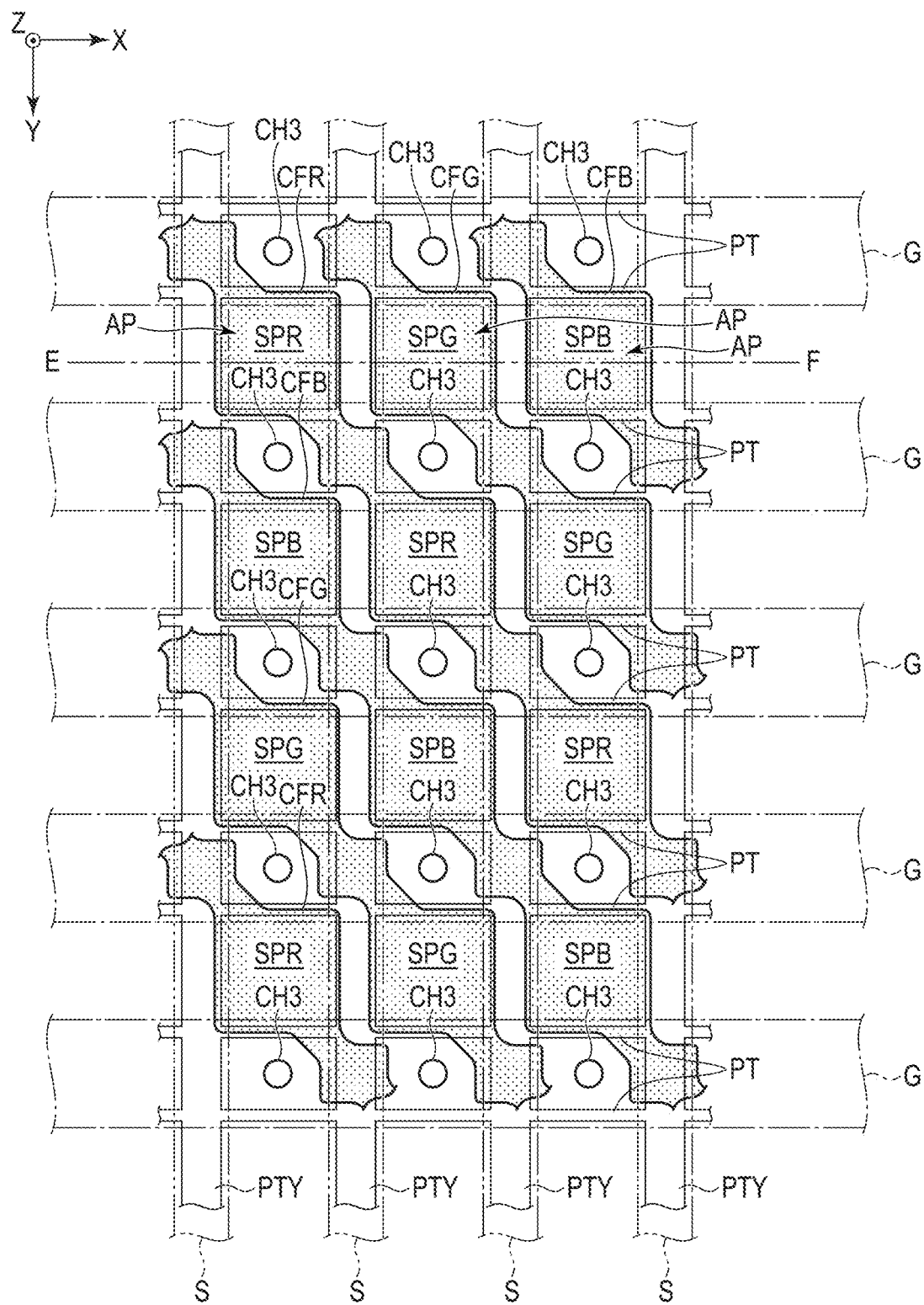
FIG. 9 is a schematic plan view of some elements of the first substrate SUB1.

FIG. 9 is a schematic plan view of some elements of the first substrate SUB1.

The example shown in FIG. 9 is different from the example shown in FIG. 8 in that projections PTY located just above the signal lines S are added as other projections. The projections PTY extend straight in the second direction Y, cross the scanning lines G, and are joined to the projections PT extending in the first direction X. The projections PTY are formed of the same material as that of the projections PT.

Figure 10:
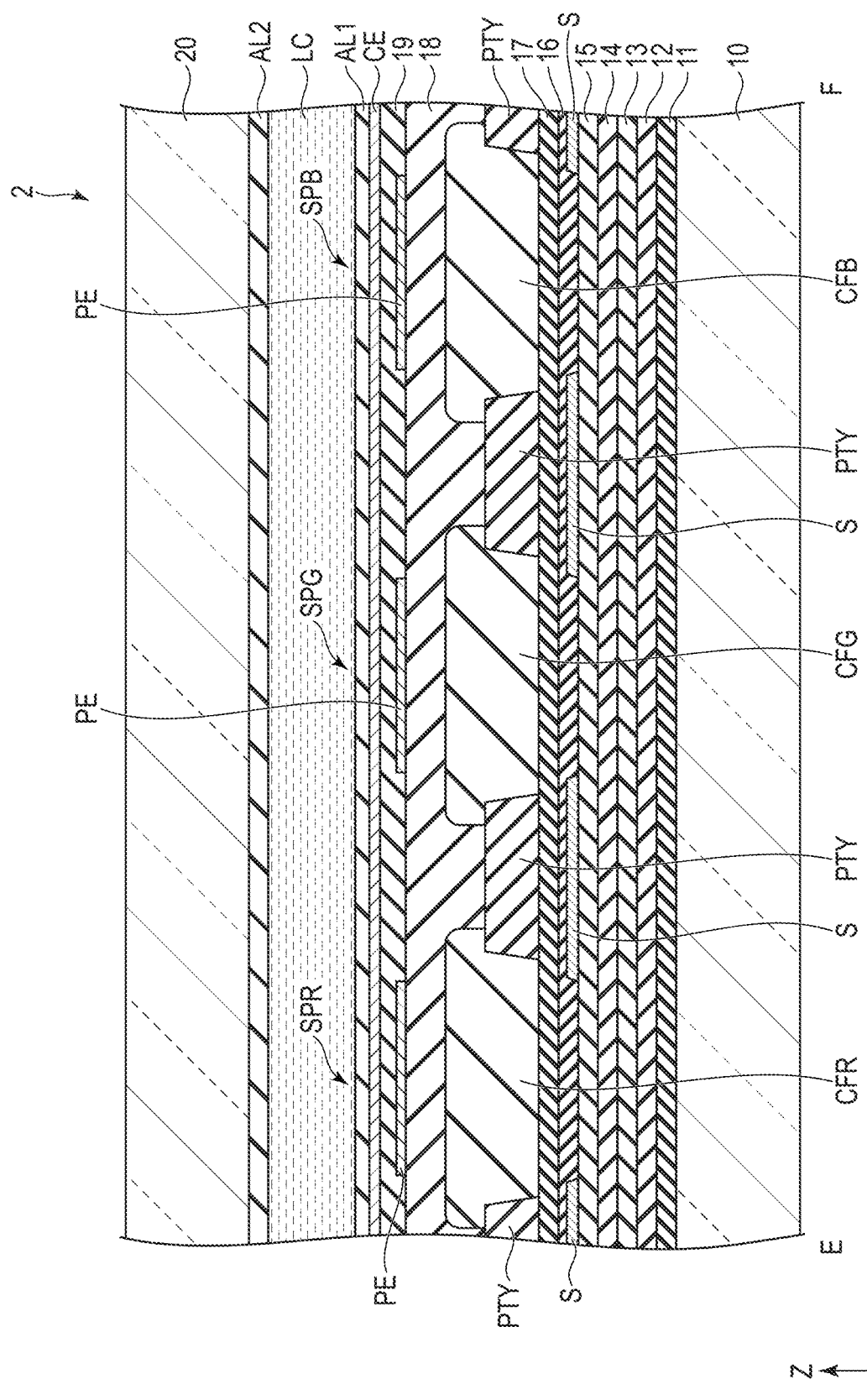
FIG. 10 is a schematic cross-sectional view of the display panel 2 along line E-F shown in FIG. 9.

FIG. 10 is a schematic cross-sectional view of the display panel 2 along line E-F shown in FIG. 9.

The projections PTY overlap the signal lines S, are disposed on the insulating layer 17, which is an inorganic insulating layer, and are covered by the insulating layer 18, which is an organic insulating layer.

Each of the color filters CFR, CFG, and CFB is disposed on the insulating layer 17 between adjacent projections PTY, contacts the projections PTY, and is covered by the insulating layer 18.

In this configuration example, too, the extension in the second direction Y of the color filters toward the contact holes CH3 can be suppressed by the projections PT as in the above-described configuration examples. Moreover, the extension in the first direction X of the color filters also can be suppressed by the projections PTY.

In the present embodiment, for example, the scanning line G1 corresponds to a first scanning line, the scanning line G2 corresponds to a second scanning line, the projection PT1 corresponds to a first projection, the projection PT2 corresponds to a second projection, the projection PT3 corresponds to a third projection, the projections PTY correspond to fourth projections, the color filter CFG corresponds to a first color filter, and the color filter CFR or CFB corresponds to a second color filter.

All display devices, which are implementable with arbitrary changes in design by a person of ordinary skill in the art based on the display devices described above as the embodiments of the present invention, belong to the scope of the present invention as long as they encompass the spirit of the present invention.

Various modifications are easily conceivable within the category of the idea of the present invention by a person of ordinary skill in the art, and these modifications are also considered to belong to the scope of the present invention. For example, additions, deletions or changes in design of the constituent elements or additions, omissions or changes in condition of the processes may be arbitrarily made to the above embodiments by a person of ordinary skill in the art, and these modifications also fall within the scope of the present invention as long as they encompass the spirit of the present invention.

In addition, the other advantages of the aspects described in the above embodiments, which are obvious from the descriptions of the specification or which are arbitrarily conceivable by a person of ordinary skill in the art, are considered to be achievable by the present invention as a matter of course.

What is claimed is:

1. A display device comprising:
a substrate;
a semiconductor disposed above the substrate;
a first scanning line;
a second scanning line adjacent to the first scanning line;
a connection electrode electrically connected to the semiconductor;
an inorganic insulating layer covering the connection electrode;
a first projection located just above the first scanning line and disposed on the inorganic insulating layer;
a second projection located just above the second scanning line and disposed on the inorganic insulating layer;
a third projection located just above the second scanning line, disposed on the inorganic insulating layer, and separated from the second projection;
a first color filter disposed on the inorganic insulating layer between the first projection and the second projection;
a second color filter contacting the third projection, disposed on the inorganic insulating layer, and separated from the first color filter;
an organic insulating layer covering the first projection, the second projection, the third projection, the first color filter and the second color filter;
a pixel electrode disposed above the organic insulating layer and electrically connected to the connection electrode; and
a common electrode opposed to the pixel electrode, wherein
the organic insulating layer contacts the inorganic insulating layer between the second projection and the third projection,
a width of the first projection is smaller than a width of the first scanning line, and
a width of the second projection is smaller than a width of the second scanning line.

2. The display device of claim 1, wherein
the first color filter is a green color filter.

3. The display device of claim 1, wherein
the pixel electrode contacts the connection electrode in a contact hole penetrating the organic insulating layer and the inorganic insulating layer between the second projection and the third projection.

4. The display device of claim 1, wherein
the second color filter is a red color filter or a blue color filter.

5. A display device comprising:
a substrate;
a semiconductor disposed above the substrate;
a first scanning line;
a second scanning line adjacent to the first scanning line;
a connection electrode electrically connected to the semiconductor;
an inorganic insulating layer covering the connection electrode;
a first projection located just above the first scanning line and disposed on the inorganic insulating layer;
a second projection located just above the second scanning line and disposed on the inorganic insulating layer;
a first color filter disposed on the inorganic insulating layer between the first projection and the second projection;
an organic insulating layer covering the first projection, the second projection, and the first color filter;
a pixel electrode disposed above the organic insulating layer and electrically connected to the connection electrode; and
a common electrode opposed to the pixel electrode, wherein
a width of the first projection is smaller than a width of the first scanning line,
a width of the second projection is smaller than a width of the second scanning line, and
a thickness of each of the first projection and the second projection is smaller than a thickness of the first color filter on the inorganic insulating layer.

6. The display device of claim 5, wherein
the width of each of the first projection and the second projection is smaller than the thickness of each of the first projection and the second projection.

7. The display device of claim 6, wherein
the first projection and the second projection are formed of a negative photosensitive resin.

8. The display device of claim 1, further comprising signal lines crossing the first scanning line and the second scanning line, wherein
each of the first projection and the second projection is formed to cross the signal lines.

9. The display device of claim 1, further comprising signal lines crossing the first scanning line and the second scanning line, wherein
each of the first projection and the second projection is cut at positions overlapping the signal lines.

10. A display device comprising:
a substrate;
a semiconductor disposed above the substrate;
a first scanning line;
a second scanning line adjacent to the first scanning line;
a signal line crossing the first scanning line and the second scanning line;

a connection electrode electrically connected to the semiconductor;
an inorganic insulating layer covering the connection electrode;
a first projection located just above the first scanning line and disposed on the inorganic insulating layer;
a second projection located just above the second scanning line and disposed on the inorganic insulating layer;
a fourth projection located just above the signal line, disposed on the inorganic insulating layer, and joined to the first projection and the second projection;
a first color filter disposed on the inorganic insulating layer between the first projection and the second projection;
an organic insulating layer covering the first projection, the second projection, and the first color filter;
a pixel electrode disposed above the organic insulating layer and electrically connected to the connection electrode; and
a common electrode opposed to the pixel electrode, wherein
a width of the first projection is smaller than a width of the first scanning line, and
a width of the second projection is smaller than a width of the second scanning line.

11. The display device of claim 1, wherein the semiconductor is a transparent oxide semiconductor.

12. The display device of claim 1, wherein the connection electrode is a transparent electrode.

13. The display device of claim 1, comprising:
a first substrate comprising the semiconductor, the first scanning line, the second scanning line, the connection electrode, the first color filter, the pixel electrode, and the common electrode;
a second substrate opposed to the first substrate; and
a liquid crystal layer between the first substrate and the second substrate.

* * * * *